(12) United States Patent
Borsum et al.

(10) Patent No.: US 7,379,442 B2
(45) Date of Patent: May 27, 2008

(54) METHOD AND APPARATUS FOR BUFFER STORAGE OF DATA PACKETS WHICH ARE TO BE TRANSMITTED VIA A CONNECTION THAT HAS BEEN SET UP

(75) Inventors: Malte Borsum, Hannover (DE); Klaus Gaedke, Hannover (DE); Thomas Brune, Hannover (DE)

(73) Assignee: Thomson Licensing, Boulogne Billancourt (FR)

( * ) Notice: Subject to any disclaimer, the term of this patent is extended or adjusted under 35 U.S.C. 154(b) by 703 days.

(21) Appl. No.: 10/491,347

(22) PCT Filed: Sep. 19, 2002

(86) PCT No.: PCT/EP02/10514

§ 371 (c)(1),
(2), (4) Date: Apr. 1, 2004

(87) PCT Pub. No.: WO03/032147

PCT Pub. Date: Apr. 17, 2003

(65) Prior Publication Data
US 2004/0255227 A1    Dec. 16, 2004

(30) Foreign Application Priority Data
Oct. 2, 2001   (DE) ............................... 101 48 767

(51) Int. Cl.
*H04Q 7/24*   (2006.01)
*H04L 12/28*  (2006.01)
*H04L 12/54*  (2006.01)

(52) U.S. Cl. ............ 370/338; 370/412; 370/420; 370/429; 711/101; 711/129; 711/147

(58) Field of Classification Search ............ None
See application file for complete search history.

(56) References Cited

U.S. PATENT DOCUMENTS

| | | | |
|---|---|---|---|
| 5,315,707 A * | 5/1994 | Seaman et al. ............... 710/56 |
| 5,991,304 A   | 11/1999 | Abramson .................. 370/413 |
| 6,529,519 B1 * | 3/2003 | Steiner et al. .............. 370/412 |
| 6,629,151 B1 * | 9/2003 | Bahl ........................... 709/250 |
| 6,728,254 B1 * | 4/2004 | Stacey et al. ................ 370/413 |
| 6,771,933 B1 * | 8/2004 | Eng et al. ................... 455/41.2 |
| 7,095,722 B1 * | 8/2006 | Walke et al. ................ 370/315 |
| 7,113,516 B1 * | 9/2006 | Shefi et al. ................. 370/412 |

FOREIGN PATENT DOCUMENTS

EP   0841833   5/1998

OTHER PUBLICATIONS

Khun-Jush, J. et al "Hiperlan Type 2 for Broadband Wireless Communication" Ericsson Review, No. 2, 2000, pp. 108-119 search report dated Nov. 10, 2003.

* cited by examiner

*Primary Examiner*—Melanie Jagannathan
(74) *Attorney, Agent, or Firm*—Joseph J. Laks; Paul P. Kiel (57) ABSTRACT

So-called LCH packets are defined in the Hiperlan Type 2 System for wire-free transmission of video and audio data streams. These LCH packets have a length of 54 data bytes. Furthermore, the Hiperlan/2 Standard provides for so-called ARQ messages to be sent back to the transmitter in an SCH packet in a QOS mode (Quality Of Service), in which all the LCH data packets must be confirmed by the receiver. Space for the LCH and SCH data packets must be provided in a buffer store in the Hiperlan/2 interface for each connection that is set up. When there is a possibility of several hundred connections having been set up, separate reservation of memory areas for LCH and SCH packets would involve considerable complexity for the memory organization. The invention proposes that only one common area be reserved for LCH and SCH packets in the buffer store. The section which is provided for each LCH package is of such a size that it corresponds to a value $2^n$ where $n \in [0, 1, 2, 3, \ldots]$, and this results in the hardware unit for the address calculation of these data section starts being greatly simplified. However, the area is chosen to be larger than actually required for the buffer storage of one LCH packet. The SCH packets, which likewise need to be buffer-stored, are entered in the unused part of such a section for an LCH packet. This considerably reduces the complexity for memory organization without having to leave a major proportion of the memory unused.

19 Claims, 6 Drawing Sheets

| | 8 | 7 | 6 | 5 | 4 | 3 | 2 | 1 |
|---|---|---|---|---|---|---|---|---|
| Octet 1 | PDU Type | | Sequence Number [9:4] | | | | | |
| Octet 2 | Sequence Number [3:0] | | | | CL-Tag [7:4] ( reserved ) | | | |
| Octet 3 | CL-Tag [3:0] ( reserved ) | | | | r | r | SAR | r |
| Octet 4 | Payload data 48 Bytes | | | | | | | |
| Octet 5 | | | | | | | | |
| ... | | | | | | | | |
| Octet 50 | | | | | | | | |
| Octet 51 | | | | | | | | |
| Octet 52 | CRC24 | | | | | | | |
| Octet 53 | | | | | | | | |
| Octet 54 | | | | | | | | |

Fig. 3

| | 8 | 7 | 6 | 5 | 4 | 3 | 2 | 1 |
|---|---|---|---|---|---|---|---|---|
| Octet 1 | PDU Type | | Sync | | CL-Tag [7:4] ( reserved ) | | | |
| Octet 2 | CL-Tag [3:0] ( reserved ) | | | | r | r | SAR | r |
| Octet 3 | Payload data 48 Bytes | | | | | | | |
| Octet 4 | | | | | | | | |
| Octet 5 | | | | | | | | |
| ... | | | | | | | | |
| Octet 50 | | | | | | | | |
| Octet 51 | | | | | | | | |
| Octet 52 | FEC Reed Solomon forward error correction code | | | | | | | |
| Octet 53 | | | | | | | | |
| Octet 54 | | | | | | | | |

Fig. 4

| | 8 | 7 | 6 | 5 | 4 | 3 | 2 | 1 |
|---|---|---|---|---|---|---|---|---|
| Octet 1 | SCH PDU Type | | | | | | | |
| Octet 2 | Payload data | | | | | | | |
| Octet 3 | | | | | | | | |
| Octet 4 | | | | | | | | |
| Octet 5 | | | | | | | | |
| Octet 6 | | | | | | | | |
| Octet 7 | | | | | | | | |
| Octet 7 | CRC16 | | | | | | | |
| Octet 8 | | | | | | | | |

Fig. 5

| Address | 31\|30\|29\|28\|27\|26\|25\|24 | 23\|22\|21\|20\|19\|18\|17\|16 | 15\|14\|13\|12\|11\|10\|9\|8 | 7\|6\|5\|4\|3\|2\|1\|0 |
|---|---|---|---|---|
| A+0000.00 | Free (for valid LCHs total 1) | LCH PDU Type | Sequence Number | CL Tag | CL-Flags |
| A+0001.00 | Payload data Byte 0 | Payload data Byte 1 | Payload data Byte 2 | Payload data Byte 3 |
| A+0010.00 | Payload data Byte 4 | Payload data Byte 5 | Payload data Byte 6 | Payload data Byte 7 |
| A+0011.00 | Payload data Byte 8 | Payload data Byte 9 | Payload data Byte 10 | Payload data Byte 11 |
| A+0100.00 | Payload data Byte 12 | Payload data Byte 13 | Payload data Byte 14 | Payload data Byte 15 |
| A+0101.00 | Payload data Byte 16 | Payload data Byte 17 | Payload data Byte 18 | Payload data Byte 19 |
| A+0110.00 | Payload data Byte 20 | Payload data Byte 21 | Payload data Byte 22 | Payload data Byte 23 |
| A+0111.00 | Payload data Byte 24 | Payload data Byte 25 | Payload data Byte 26 | Payload data Byte 27 |
| A+1000.00 | Payload data Byte 28 | Payload data Byte 29 | Payload data Byte 30 | Payload data Byte 31 |
| A+1001.00 | Payload data Byte 32 | Payload data Byte 33 | Payload data Byte 34 | Payload data Byte 35 |
| A+1010.00 | Payload data Byte 36 | Payload data Byte 37 | Payload data Byte 38 | Payload data Byte 39 |
| A+1011.00 | Payload data Byte 40 | Payload data Byte 41 | Payload data Byte 42 | Payload data Byte 43 |
| A+1100.00 | Payload data Byte 44 | Payload data Byte 45 | Payload data Byte 46 | Payload data Byte 47 |
| A+1101.00 | CRC 24 ( not entered in the memory ) | | | unused |
| A+1110.00 | unused | | | |
| A+1111.00 | | | | |

Fig.6

| Address | 31 30 29 28 27 26 25 24 23 22 21 20 19 18 17 16 | 15 14 13 12 | 11 10 9 8 7 6 5 4 | 3 2 1 0 |
|---|---|---|---|---|
| A+0000.00 | Free (for valid LCHs total 1) | LCH PDU Type | Sync | CL Tag | CL-Flags |
| A+0001.00 | Payload data Byte 0 | Payload data Byte 1 | Payload data Byte 2 | Payload data Byte 3 |
| A+0010.00 | Payload data Byte 4 | Payload data Byte 5 | Payload data Byte 6 | Payload data Byte 7 |
| A+0011.00 | Payload data Byte 8 | Payload data Byte 9 | Payload data Byte 10 | Payload data Byte 11 |
| A+0100.00 | Payload data Byte 12 | Payload data Byte 13 | Payload data Byte 14 | Payload data Byte 15 |
| A+0101.00 | Payload data Byte 16 | Payload data Byte 17 | Payload data Byte 18 | Payload data Byte 19 |
| A+0110.00 | Payload data Byte 20 | Payload data Byte 21 | Payload data Byte 22 | Payload data Byte 23 |
| A+0111.00 | Payload data Byte 24 | Payload data Byte 25 | Payload data Byte 26 | Payload data Byte 27 |
| A+1000.00 | Payload data Byte 28 | Payload data Byte 29 | Payload data Byte 30 | Payload data Byte 31 |
| A+1001.00 | Payload data Byte 32 | Payload data Byte 33 | Payload data Byte 34 | Payload data Byte 35 |
| A+1010.00 | Payload data Byte 36 | Payload data Byte 37 | Payload data Byte 38 | Payload data Byte 39 |
| A+1011.00 | Payload data Byte 40 | Payload data Byte 41 | Payload data Byte 42 | Payload data Byte 43 |
| A+1100.00 | Payload data Byte 44 | Payload data Byte 45 | Payload data Byte 46 | Payload data Byte 47 |
| A+1101.00 | 32 bit Reed Solomon FEC | | | |
| A+1110.00 | unused | | | |
| A+1111.00 | | | | |

Fig. 7

| Address | 31 30 29 28 27 26 25 24 | 23 22 21 20 19 18 17 16 15 14 13 12 11 10 9 8 7 6 5 4 3 2 1 0 |
|---|---|---|
| A+0000.00 | For valid LCHs total | |
| A+0001.00 | | |
| A+0010.00 | | |
| A+0011.00 | | |
| A+0100.00 | | LCH |
| A+0101.00 | | |
| A+0110.00 | | |
| A+0111.00 | | |
| A+1000.00 | | |
| A+1001.00 | | |
| A+1010.00 | | |
| A+1011.00 | | |
| A+1100.00 | | |
| A+1101.00 | | unused |
| A+1110.00 | For valid SCHs total | SCH |
| A+1111.00 | | |

METHOD AND APPARATUS FOR BUFFER STORAGE OF DATA PACKETS WHICH ARE TO BE TRANSMITTED VIA A CONNECTION THAT HAS BEEN SET UP

This application claims the benefit, under 35 U.S.C. § 365 of International Application PCT/EP02/10514, filed Sep. 19, 2002, which was published in accordance with PCT Article 21(2) on Apr. 17, 2003 in English and which claims the benefit of German patent application No. 10148767.3, filed Oct. 02, 2001.

The invention relates to the technical field of memory management for buffer stores for data transmissions between appliances via connections that have been set up.

Prior Art

Recently, there has been major progress in the networking of domestic appliances, which may be, for example, entertainment electronics appliances or else other domestic appliances. In this case, not only systems in which the appliances are networked by means of wires, that is to say with corresponding cable connections between the appliances, such as the IEEE1394 Bus System, are used, but, in addition, major efforts are being made to network appliances without the use of wires. Various systems have, in the mean time, also been developed here. The so-called Hiperlan Type 2 System should be mentioned in particular at this point. The Hiperlan/2 System allows appliances to be networked, for example in a domestic environment. A number of channels with a width of approximately 20 MHz are available in the 5 GHz band, and are themselves subdivided using a TDMA method. The modulation method corresponds to an OFDM method, so that multipath reception causes as little interference as possible. The maximum data rate is in the region of 54 Mbit/s. It is thus even possible to transmit video data streams and other applications where there are large amounts of data using the Hiperlan channels.

The Hiperlan/2 System is now intended to be developed into a derived ETSI Standard. A number of ETSI documents already exist in which the Hiperlan/2 System is specified. For example, the DLC Layer (Data Link Control) (which corresponds to the data switching layer in the ISO/IEC seven-layer model) is described in the ETSI TS 101 761-x (x∈[1, 4]) documents. The overall system is then described in a number of ETSI documents, all of which, however, can be obtained from the European Telecommunication Standard Institute at F-06921 Sophia Antipolis Cedex/France.

The Hiperlan/2 System makes it possible to set up a large number of connections in parallel. The Hiperlan/2 System is connection-oriented. There are two types of connection, namely point-to-point connections and point-to-multipoint connections. A point-to-point connection is bidirectional, while a point-to-multipoint connection is unidirectional, in the direction of the portable or mobile terminal. The corresponding Hiperlan interface therefore has to be able to distinguish between and to set up a large number of connections. The system is designed such that even up to several hundred connections can be set up in parallel.

It is then also necessary to distinguish between various types of logical channels which may be associated with one connection. The LCH and SCH channels (which correspond to long transport channel and short transport channel) are particularly important in this context. The LCH channel represents a channel with a relatively large transmission capacity, via which even isochronous data such as video data streams and audio data streams can be transmitted. The SCH channel has a smaller transport capacity, and is therefore used for transmitting asynchronous data, such as control information and acknowledgement messages in accordance with the transmission protocol.

At least one LCH channel and one SCH channel may be associated with one connection. This complicates the memory organization for the buffer memory in which all the data packets which are intended to be transmitted via the air interface or have been received via the air interface and are intended to be passed on to an application. By way of example, and specifically, one ad hoc solution envisages a memory area being reserved for the LCH channel and a second memory area being reserved for the SCH channel for each connection that is set up. Since these memory areas for an LCH channel or for an SCH channel are set up as ring buffers, it is therefore necessary to store a start address and an end address for each channel, and to set up at least one write pointer and one read pointer for each channel, in order that the data can be written and read using mutually independent processes. If several hundred connections have been set up, this memory organization complexity is considerable.

The data packets which transmit the data in an LCH channel have, in accordance with the specification, a size of 54 bytes, comprising 48 payload data bytes, three or two data bytes of additional information (header information) plus three or four bytes for an error recognition (CRC) or error correction code (FEC), if used. The CRC code need not necessarily be buffer-stored, since the CRC code can also be calculated and decoded "on-the-fly", which makes buffer storage of this code unnecessary. The data sections for one LCH channel would therefore have to have a size of 51 or 54 bytes. The complexity for calculating the addresses of the starts of these data blocks is therefore increased, since these are data blocks with a size, for example, of $2^6=64$ bytes, rather than being data blocks with a size of $2^n$ bytes.

Invention

The aim of the invention is to simplify the memory organization for the buffer store for the air interface. According to the invention, this is achieved in that the data block size for the LCH packets is first of all enlarged to a value of $2^6=64$ bytes, and the part of a data block which remains free is used for storage of data from the SCH packets. This is because the SCH packets require a memory space of 7 bytes for buffer storage and, to this extent, can be stored together with the LCH packets, whose maximum size is 54 bytes, in one 64-byte block. The remaining three bytes may be used for further additional information.

The invention has the advantage that, firstly, the address calculation unit for the data blocks where the LCH packets are intended to be stored is greatly simplified. Secondly, however, the invention also has the advantage that LCH packets and SCH packets for one connection can be stored jointly in a common memory section, so that, in addition, fewer address pointers need to be set up for the start and end of each memory area. Furthermore, the invention also has the advantage that, for LCH packets with a size of 54 bytes and SCH packets with a size of 7 bytes, only 4.6% of the memory would remain unoccupied, assuming that one SCH packet is stored for each LCH packet.

The dependent claims allow further advantageous measures and improvements of the method and the apparatus according to the invention.

Since the buffer-stored data packets are in any case intended to be emitted as quickly as possible to the application or to a further interface, or via an antenna, it is advantageous to set up a reserved section as a ring buffer in the buffer store for each connection that is set up. This means that, once the reserved section in the buffer store has been filled, the next data packets are once again written at the start of the section, with the data that has previously been buffer-stored there then being overwritten, although this has no disadvantageous effect, since data such as this will have been passed on well before this time.

The measure according to claim 5 and claim 12 is also highly advantageous, on the basis of which at least one byte is additionally stored during the buffer storage of a data packet, containing status information relating to that data packet, namely and in particular as to whether the data packet has already been completely written, that is to say whether or not it is ready to be passed on. This measure makes the writing and reading processes highly flexible, and there is no need to always completely write a complete LCH or SCH data packet. The writing and reading processes can be interrupted a number of times without this leading to conflicts relating to memory access. In addition, it is also advantageous to provide an associated write and read pointer for the respective LCH and SCH packets. A note should then be made in each of these as to the points at which the writing or reading process of a data packet has been interrupted, so that the process can be continued seamlessly from the correct point when the next write or read access takes place.

Since, according to the Hiperlan/2 System, one channel pair comprising an LCH channel and an SCH channel is always set up for each connection, it is questionable whether a correspondingly large number of SCH data packets will ever occur when, for example, a video data stream is being transported via the LCH channel. This is the case in the transmission mode, in which the LCH data packets are protected by CRC error recognition code. This is because data packets such as these are "positively" or "negatively" acknowledged by means of so-called ARQ messages (Automatic Repeat Request). A positive acknowledgement in this case means that correct reception of an LCH data packet is signalled to the transmitter. A negative acknowledgement then means that the transmitter receives an acknowledgement message only when an LCH packet has been transmitted with one or more errors. However, even in the negative acknowledgement mode, SCH packets frequently have to be sent back, and these must likewise be buffer-stored in the buffer store.

The greater the amount of data to be transmitted via one connection, the larger the associated area must be in the buffer store. However, in this case, it is also necessary to transmit more LCH packets and, at the same time, also to transmit back more ARQ messages, thus utilizing the data sections, which have been enlarged to $2^n$ data units (bytes), for the LCH packets.

DRAWINGS

Exemplary embodiments of the invention will be explained in more detail in the following description and are illustrated in the drawings, in which.

DETAILED DESCRIPTION OF THE INVENTION

The invention will be explained using the example of the implementation of a buffer store for a Hiperlan/2 interface.

Figure 1:
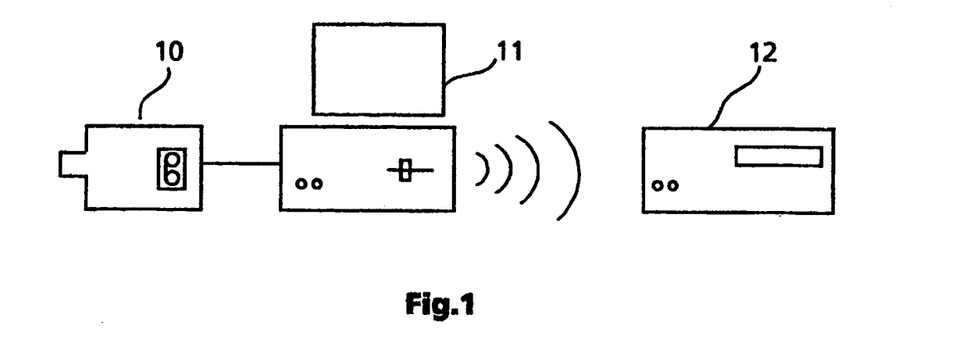
FIG. 1 shows the application for transmission for video and audio data originating from a DV camcorder to a DVHS video recorder.
Figure 2:
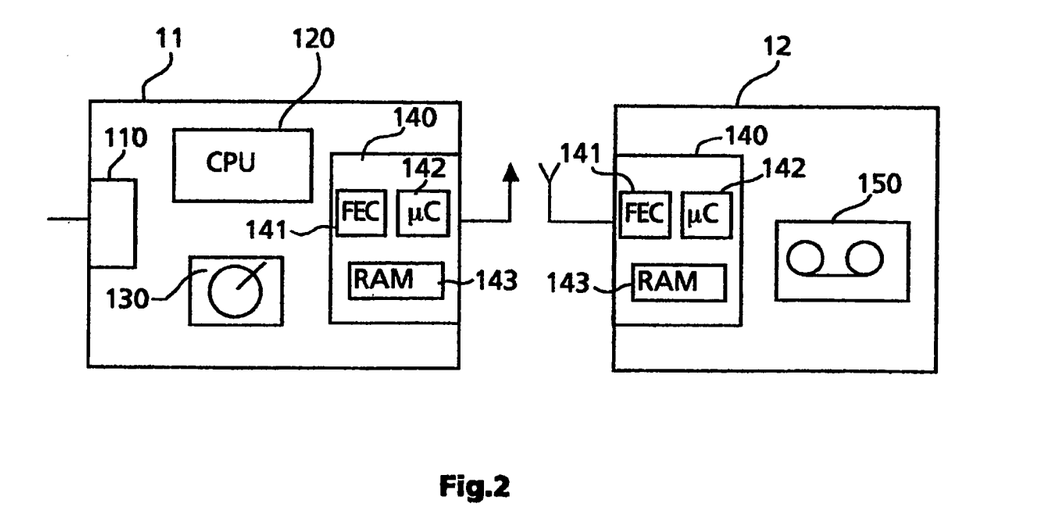
FIG. 2 shows a rough block diagram of a personal computer for postprocessing of the video and audio data originating from the camcorder, and a rough block diagram of the DVHS video recorder.

FIG. 1 shows one example of an application. The reference number 10 denotes a camcorder, for example a mini DV camcorder. This is connected via an IEEE1394 connection to a personal computer 11. The personal computer 11 is used to carry out the postprocessing of a recorded video. To do this, it must be programmed with suitable software. The complete video is then first of all stored on a hard disk. Based on the illustrated application, this complete video is, however, passed on without the use of wires, for archiving purposes, to a DVHS video recorder 12. This need not necessarily be located in the same room as the personal computer 11. The wire-free transmission of the video and audio data from the postprocessed video film is intended to be carried out using the Hiperlan/2 System. To do this, of course, both the personal computer 11 and the DVHS video recorder 12 must be equipped with an appropriate Hiperlan interface. FIG. 2 shows the rough layout of the personal computer and of the DVHS video recorder in more detail.

The layout of the personal computer 11 will be explained first of all. Only those components of the personal computer which are essential for postprocessing will be explained. These relate to an IEEE1394 interface 110, a CPU 120, a hard disk 130 and a Hiperlan interface 140. The video and audio data from the camcorder 10 are passed via the IEEE1394 bus and the interface 110 to the personal computer 11. The program which is used for postprocessing of the video/audio data is processed by the CPU 120. The completely processed video/audio data is initially stored on the hard disk 130.

The complete video film is then transmitted, under user control, to the DVHS video recorder 12 for archiving on a DVHS video tape. This is intended to be done in accordance with the Hiperlan/2 Standard, as mentioned. The rough layout of the interface 140 is likewise illustrated in FIG. 2. The reference number 141 denotes an error correction code calculation unit. The reference number 142 denotes a microcontroller, which coordinates a large number of processes in the interface 140 in order to implement the Hiperlan/2 protocol. The figure likewise illustrates the buffer store 143, in which all the data packets to be transmitted via the air interface are buffer-stored. The buffer store 143 is used for both transmission directions. As shown in FIG. 2, a transmitting antenna is fitted to the personal computer 11. However, this antenna also at the same time acts as a receiving antenna, when data is being transmitted from some other appliance to the personal computer without using wires.

The layout of the DVHS video recorder 12 is illustrated in highly simplified form, and it likewise contains a Hiperlan/2 interface 140. Furthermore, the reference number 150 denotes a magnetic tape cassette, on which the received data is finally recorded. The data may be recorded using the DV data format, in which case no reformatting is required, since the data source 10 has likewise recorded the data using this format. The components 141-143 of the Hiperlan/2 interface 140 are once again emphasized, as has already been mentioned above.

Instead of the DVHS video recorder it is also, of course, possible to use any other recorder, for example a DVD recorder.

As has already been explained in the introduction, the Hiperlan/2 System is an accepted ETSI Standard, which is technically specified in a number of documents. For disclosure purposes relating to this invention, reference is therefore expressly made to this ETSI Standard. In this case, reference is made in particular to the document ETSI TS 101 761-x with x∈[1, 2, 3, 4] "Broadband Radio Access Radio Networks (BRAM); Hiperlan Type 2; Data Link Control (DLC); Part 1 to Part 4. In addition, reference is also made to the international patent application from Telefonaktiebolaget LM Ericsson with the publication number WO 00/60796, in which the MAC protocol (Medium Access Control) for the Hiperlan/2 Systems is explained in more detail.

Based on this protocol, so-called LCH (Long Transport Channel) data packets are used for transporting video/audio data streams via the air interface. In accordance with the Hiperlan/2 specification, the data can be transmitted in various QOS modes (Quality of Service). The data packets may be transmitted with positive/negative acknowledgement, they may be sent without acknowledgement, and they may even be sent repeatedly for reliability, security or safety reasons.

Different formats for the LCH data packets are provided for the two first-mentioned QOS modes.

Figure 3:
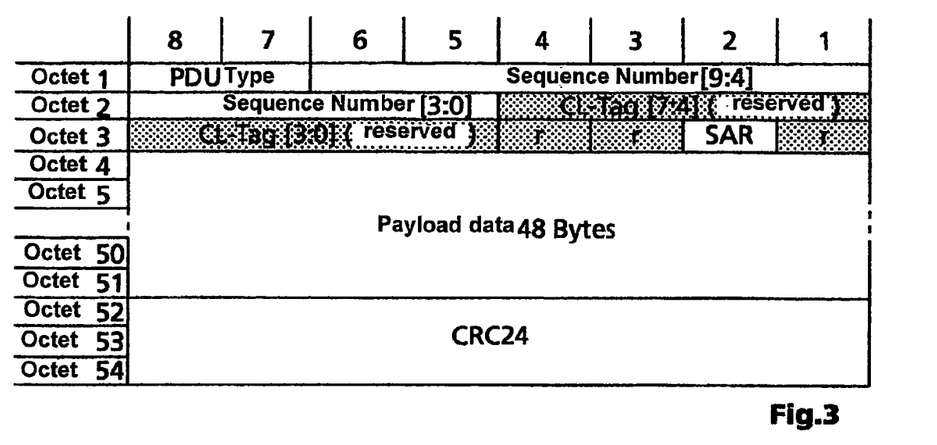
FIG. 3 shows the layout of an LCH data packet with a CRC error recognition code.

FIG. 3 shows the format of an LCH data packet which is used for the QOS mode with acknowledgement. The LCH packet comprises 54 bytes, of which 48 bytes relate to payload data bytes, three bytes relate to additional information (header information) and the last three bytes relate to the error recognition code CRC 24. The additional information in the first three bytes of the data packet relate to the details about the PDU type (Protocol Data Unit), as listed, by way of example, in Section 6.1.4 of the document ETSI TS 101 761-1 V1.2.1 (2000-11). Furthermore, the sequence number is also stored as additional information, comprising 10 bits, in the first two bytes of the data packet, effectively acting as a serial number for the LCH data packets. The structure of the data packet as shown in FIG. 3 is illustrated, for example, in FIG. 25, in Section 6.2.8, of the abovementioned ETSI document. One difference between FIG. 3 and FIG. 25 in the ETSI document is that, in FIG. 3, 1.5 bytes are also reserved for additional information in the second and third bytes of the data packet. This is not yet shown in FIG. 25. However, if all the specification requirements are taken into account, it necessarily follows from this that this additional information is also additionally required. Furthermore, no service is yet provided in which more than 48 payload data bytes need to be transmitted in each LCH data packet. The reserved CL tag bits are reserved for future use, but so far have no further significance for transmission. Only, the SAR bit (Segmentation Reassembly End Flag) is required, and marks the last of the received LCH data packets within a PDU data train (group of LCH packets, PDU train).

Figure 4:
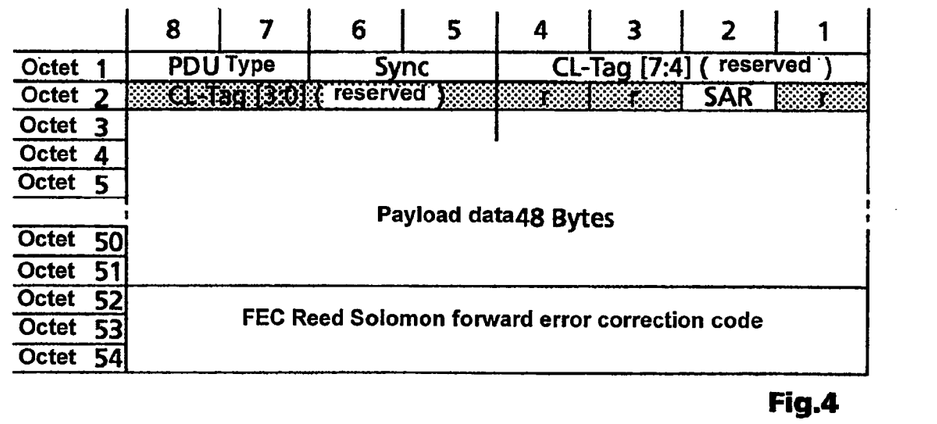
FIG. 4 shows the layout of an LCH data packet with an FEC error correction code.
Figure 5:
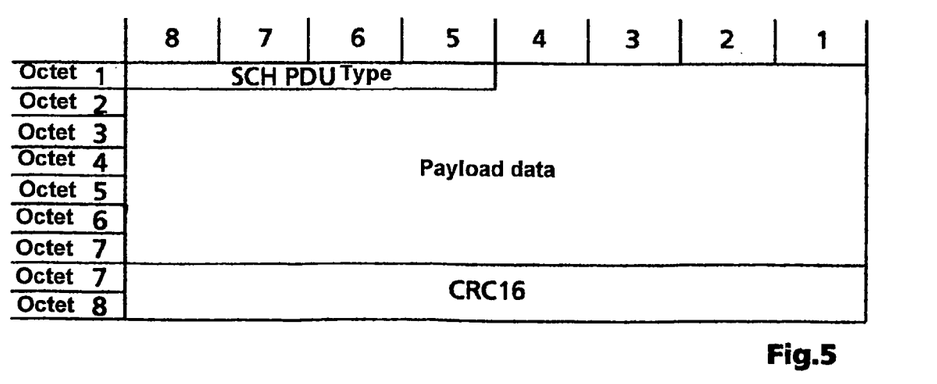
FIG. 5 shows the layout of an SCH data packet.

The structure of the LCH data packet for the unacknowledged transmission mode is shown in FIG. 4. In this case, the last four bytes relate to a forward error correction code FEC, which may likewise be calculated as a Read Solomon code. In this case as well, there are once again 48 payload data bytes in the packet. However, only two bytes need to be reserved for the additional information. In this unacknowledged operating mode, there is no need to transmit a sequence number. This situation is described in FIG. 7, in Section 5.8.4.2, of the ETSI document ETSI TS 101 761-4 V1.2.1 (2000/12). The parts of the additional information on a grey background are therefore stressed once again in FIG. 4, since they are not evident from FIG. 7 of that document but result from further requirements in the ETSI Standard. The layout of SCH data packets as required for the acknowledged QOS mode is shown in FIG. 5. The last two bytes of an SCH packet relate to a CRC error recognition code. The second nibble in the first byte once again relates to the details of the PDU type. An SCH packet such as this allows five full payload data bytes to be transmitted. In the application under consideration here, an ARQ message is in each case transmitted back to the transmitter for acknowledgement, in an SCH packet such as this.

The layout of the SCH packet illustrated in FIG. 5 is also evident from FIG. 12, in Section 6.1.5, of the ETSI document ETSI TS 101 761-1 V1.2.1 (2000-11). The layout of ARQ messages is explained in Section 6.2.9.2 of the same ETSI document for the various applications of positive acknowledgement, negative acknowledgement and repetition mode, and therefore does not need to be explained in any more detail here.

Figure 6:
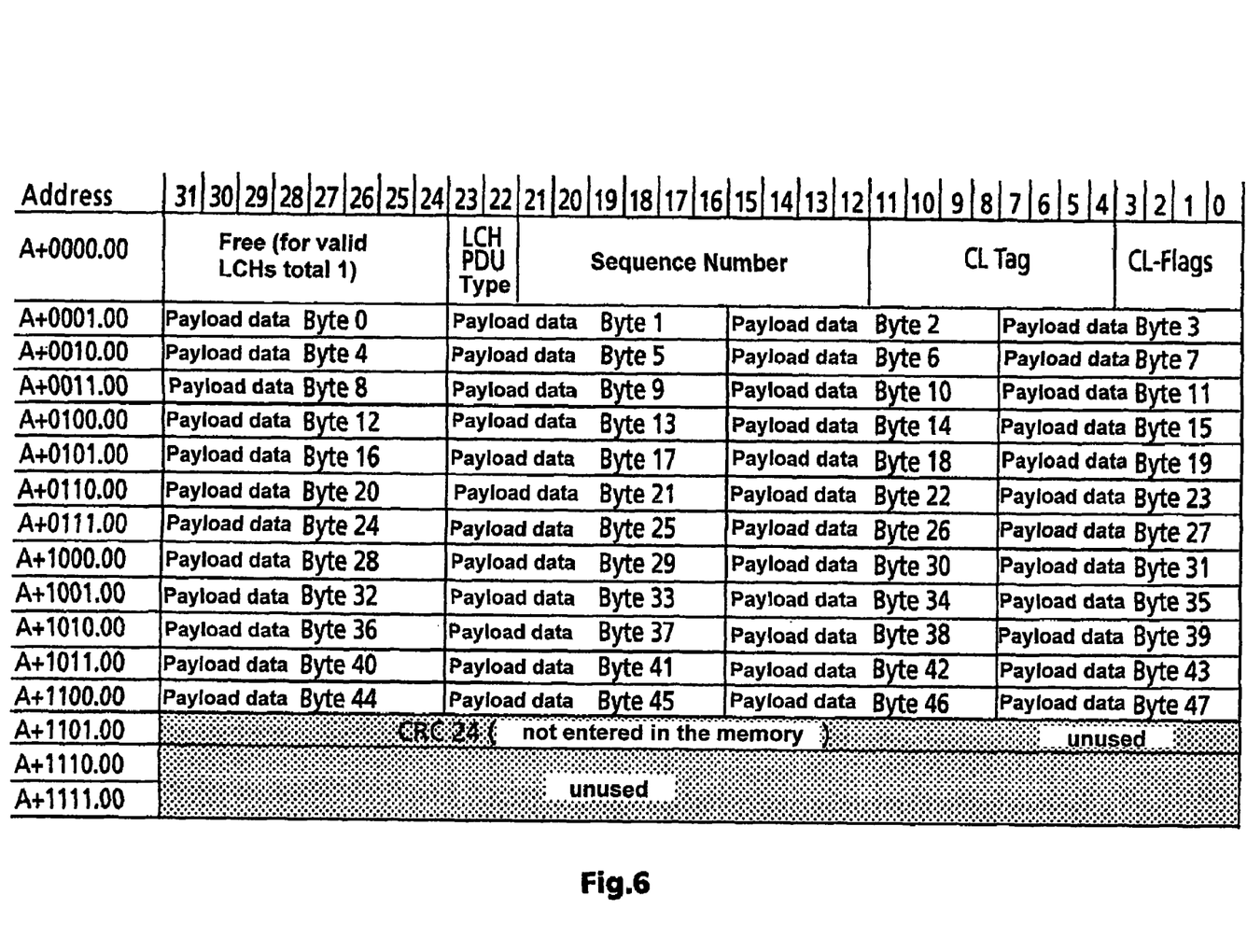
FIG. 6 shows the arrangement of the LCH data packet with an error correction code CRC in the reserved area of the buffer store, for buffer storage.

FIG. 6 illustrates how an LCH data packet as shown in FIG. 3 must be written to the buffer store for buffer storage. The buffer store is advantageously organized for memory words of four bytes, that is to say in quadlet units. However, special hardware ensures that, when an address in the buffer store is accessed, only a single byte of a quadlet can be read or written, as well. This is indicated by the two digits after the decimal point in the address details in FIG. 6. The first quadlet is used to buffer-store not only the three bytes for the additional information in the LCH packet, but an additional byte is also reserved in fourth place, in which status information for the LCH packet can be stored. Each processing step thus results in signalling as to whether the packet has or has not already been completely written. This makes it possible to write such a data packet in the form of successive memory words. The two last quadlets, which are on grey backgrounds, are admittedly still illustrated in FIG. 6, but are identified as being unused. This is due to the fact that, in order to simplify the address calculation for the buffer storage of LCH packets, the invention provides for the corresponding memory area in the buffer memory to be subdivided into sections whose size is 64 bytes, that is to say into sections of 16 quadlets. This greatly simplifies the address calculation unit. This is because it can easily determine the start of the next section by incrementation of the most significant part of the address, ignoring the six least significant address bits. It should also be mentioned that the CRC 24 checkword need not be entered in the buffer store, and is therefore also on a grey background, since the CRC calculation can be carried out by means of suitable hardware in real time during the transmission and during the decoding of received data. The resultant free space in the respective 64 byte block can be used for storage of the SCH packets which have to be sent back to the transmitter in the acknowledged QOS mode.

Figure 7:
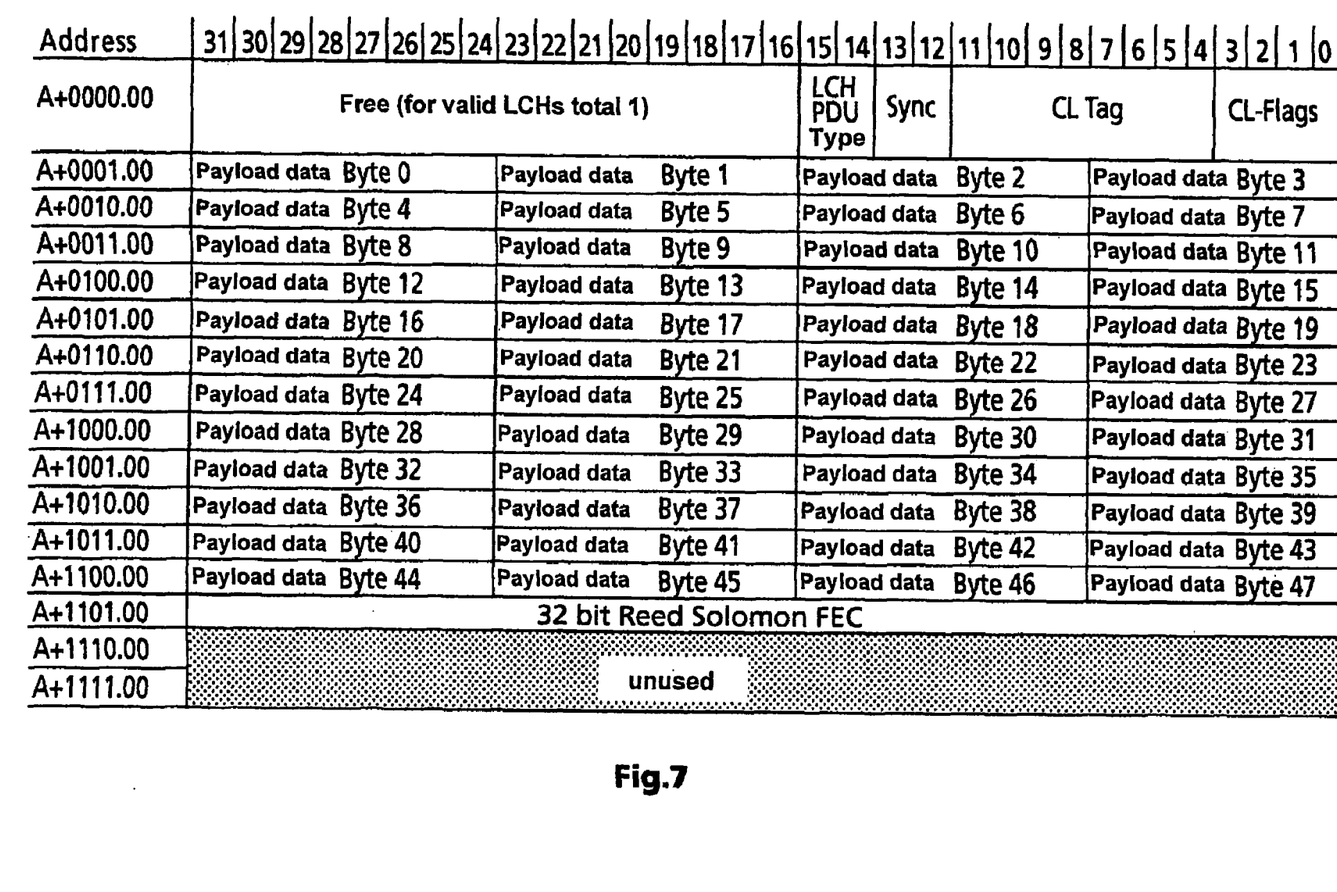
FIG. 7 shows the arrangement of an LCH data packet with an FEC error correction code in the reserved area of a buffer store, for buffer storage.

This situation is different to that for the LCH packets shown in FIG. 4. FIG. 7 shows the format in which these are stored in the buffer store. Owing to the lack of a sequence number, two bytes are in this case reserved for status information in the first quadlet. This then aligns the subsequent payload data bytes such that they are immediately adjacent in the buffer store, which is organized on the basis of quadlets. The 48 payload data bytes thus follow in the next 12 quadlets. The fourteenth quadlet is still used by the FEC error correction code. This is because this need not be calculated in real time during the transmission or the reception of a data packet, and must therefore likewise be buffer-stored. The remaining two quadlets are once again still unused, however. They may admittedly be used for buffer storage of SCH packets but, since LCH packets with FEC code such as these are used only for the unacknowledged QOS mode, that is to say no acknowledgement messages are produced, which occur regularly and could use up a significant amount of memory. However, it is possible to store SCH packets from other connections in this memory area.

Figure 8:
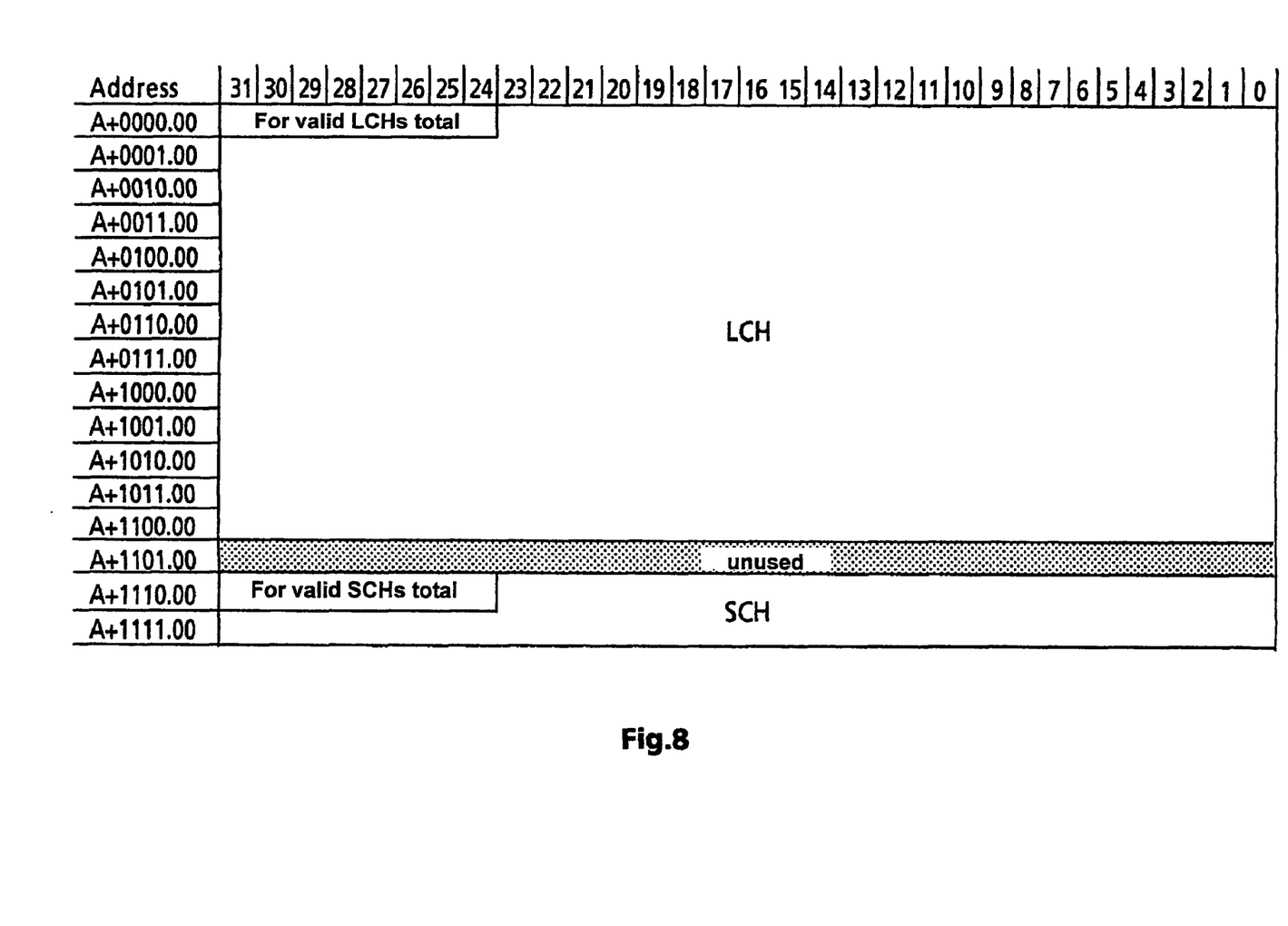
FIG. 8 shows the interleaving of an SCH data packet in the reserved block for an LCH packet with an error recognition code CRC.

FIG. 8 also shows an interleaved SCH packet in the memory block, whose size is 64 bytes, for an LCH packet. The fourteenth quadlet, which remains unused and is arranged between the LCH and SCH packets, is shown on a grey background. This quadlet may be used for storing additional information.

Figure 9:
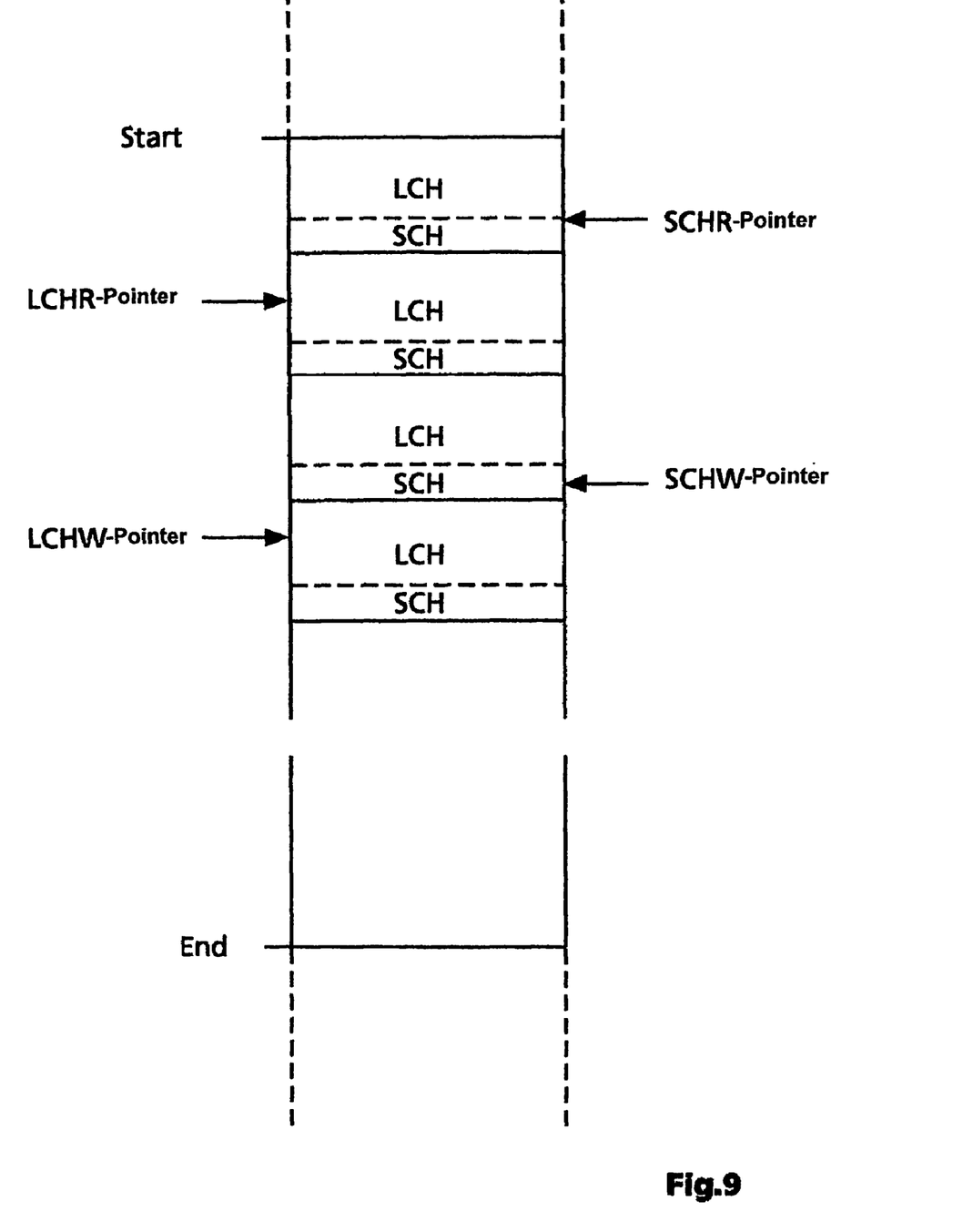
FIG. 9 shows the concept of the ring buffer for each memory area in the buffer store, which is reserved for one connection with corresponding LCH and SCH write and read pointers.

Finally, FIG. 9 also shows the complete memory area which is reserved in the buffer memory for one connection. The start of this memory area is marked by the word start. The end of the reserved area is marked in a corresponding way with the word end. Corresponding pointers are also applied in the interface, thus defining where the reserved area for the associated connection is located in the memory. Furthermore, the section of the buffer store that is illustrated is organized as a ring buffer. This means that the memory area is first of all filled with LCH and SCH packets from the start of the memory area. The memory is then filled ever further in the downward direction, until the end of the reserved memory area is reached. If any more data arrives for buffer storage, then this must be entered once again at the start of the reserved memory area. When setting up the connection, the memory management has to estimate the size of the memory area which must be reserved for the service to be transmitted, in order to avoid read/write conflicts. This is defined on the basis of the required data rate. The corresponding process is likewise described in the specification of the Hiperlan/2 Standard.

FIG. 9 also in each case shows the write and read pointers for the LCH and SCH packets. The LCHR pointer corresponds to the read pointer for LCH packets. The LCHW pointer corresponds to the write pointer for LCH packets. FIG. 9 shows that the LCHW pointer points to an entry further down in the reserved memory area, while the LCHR pointer is set to a point further up in the memory area. The area above the LCHR pointer can once again be overwritten by LCH packets. Corresponding pointers are also provided for the SCH packets. The SCHR pointer once again relates to the read pointer, and the SCHW pointer relates to the write pointer for the SCH packets.

The invention can be used in particular for the Hiperlan/2 System. However, it is not restricted exclusively to this system. In fact, it can be used wherever a pair of data packets must be buffer-stored for connections that have been set up, in which one of the data packets can in each case be used to fill memory areas which are not used by the other data packet, if the data packet size of the first data packet differs from a value of $2^n$ data units.

The invention claimed is:

1. Method for buffer storage of data packets of a first type and of a second type which are to be transmitted via a connection that has been set up, with the data packets of the first type having a defined first length which does not correspond to a number 2n, n$\in$[0, 1, 2, 3, . . . ] of data units, with the data packets of the second type having a defined second length which is shorter than the defined first length, and having a buffer store for the data packets, wherein the buffer store is subdivided into sections whose size is 2n data units, where 2n is greater than the defined first length plus the defined second length, and that part of the buffer store which is not occupied per data section is filled with the data from the data packets of the second type.

2. Method according to claim 1, in which one area of the buffer store is reserved for a connection that has been set up, and this area is organized as a ring buffer in the buffer memory.

3. Method according to claim 1, in which the data unit relates to a binary number with a length of 8 bits.

4. Method according to claim 1, in which the buffer store is organized in memory words, whose length corresponds to an even multiple of, in particular to four times, the length of a data unit.

5. Method according to claim 1, in which, during the buffer storage of a data packet, at least one byte is additionally stored which contains status information relating to the data packet, in particular as to whether the data packet has already been completely written.

6. Method according to claim 1, in which the connection that has been set up is a connection based on the Hiperlan Type 2 Standard and a data packet of the first type is an LCH packet based on the Hiperlan Type 2 Standard, and a data packet of the second type is an SCH packet based on the Hiperlan Type 2 Standard.

7. Method according to claim 6, in which a completely written, buffer-stored LCH data packet contains 48 payload data bytes and, with additional information, has a size of 52 bytes or 56 bytes, and the buffer store is subdivided into sections whose size is 64 bytes, with the remaining 12 or 8 bytes being used for buffer storage of an SCH packet.

8. Method according to claim 6, in which an ARQ message based on the Hiperlan/2 Standard is stored in the SCH packet.

9. Method according to claim 1, wherein the connection is a common connection with respect to the data packets of the first and of the second type.

10. Method according to claim 1, the buffer store is filled in a two-pass approach, wherein the data packets of the first type are placed in the buffer store on a section-by-section basis in a first pass, and the part of the buffer store which is not occupied per data section is filled with the data from the data packets of the second type during a second pass.

11. Method according to claim 1, wherein in a negative acknowledgement mode, a transmitter receives an acknowledgement message only when a data packet of the first type has been transmitted with one or more errors.

12. Apparatus for buffer storage of data packets of a first and of a second type which are to be transmitted via a connection that has been set up, in which the data packets of the first type have a defined first length which does not correspond to a number 2n, n$\in$[0, 1, 2, 3, . . . ] of data units, with the data packets of the second type having a defined second length which is shorter than the defined first length, having a buffer store for the data packets, wherein the buffer store is subdivided into sections whose size is 2n data units, where 2n is greater than the defined first length plus the defined second length, and in that that part of the buffer store which is not occupied per data section is used for buffer-storing the data packets of the second type.

13. Apparatus according to claim 12, in which the data unit relates to a binary number with a length of 8 bits.

14. Apparatus according to claim 12, in which the buffer store is organized in memory words, whose length corresponds to an even multiple of, in particular to four times, the length of a data unit.

15. Apparatus according to claim 12, having evaluation means for the status information, which is stored in at least one additional byte, for the buffer-stored data packet, in particular as to whether the data packet has already been completely written.

16. Apparatus according to claim 12, in which a data area is reserved in the buffer store for the data packets which are to be transmitted via a connection that has been set up, with start and end information being stored for the reserved data area for a connection, and with a write pointer and a read pointer being provided for the data of the data packets of the first and the second type.

17. Apparatus according to claim 12, wherein the connection is a common connection with respect to the data packets of the first and of the second type.

18. Apparatus according to claim 12, the buffer stare is filled in a two-pass approach, wherein the data packets of the first type are placed in the buffer store on a section-by-section basis in a first pass, and the part of the buffer store which is not occupied per data section is filled with the data from the data packets of the second type during a second pass.

19. Apparatus according to claim 12, wherein in a negative acknowledgement mode, a transmitter receives an acknowledgement message only when a data packet of the first type has been transmitted with one or more errors.

* * * * *